United States Patent
Hovland et al.

(10) Patent No.: US 8,570,829 B2
(45) Date of Patent: Oct. 29, 2013

(54) DEPTH STEERABLE SEISMIC SOURCE ARRAY

(75) Inventors: Vidar Hovland, Hagan (NO); Tore Steinsland, Bergen (NO); Karl Petter Elvestad, Trogstad (NO)

(73) Assignee: PGS Geophysical AS, Lysaker (NO)

( * ) Notice: Subject to any disclaimer, the term of this patent is extended or adjusted under 35 U.S.C. 154(b) by 842 days.

(21) Appl. No.: 12/655,062

(22) Filed: Dec. 22, 2009

(65) Prior Publication Data

US 2011/0149681 A1 Jun. 23, 2011

(51) Int. Cl.
*G01V 1/38* (2006.01)
*G01V 1/137* (2006.01)

(52) U.S. Cl.
CPC ............. *G01V 1/3826* (2013.01); *G01V 1/137* (2013.01)
USPC .............. 367/16; 367/144; 114/331; 114/245

(58) Field of Classification Search
CPC ..................................... G01V 1/3826
USPC ......................... 114/333; 367/144
See application file for complete search history.

(56) References Cited

U.S. PATENT DOCUMENTS

| | | | |
|---|---|---|---|
| 644,943 A * | 3/1900 | Pino ............................... | 405/190 |
| 694,153 A * | 2/1902 | Holland ......................... | 114/333 |
| 1,487,138 A * | 3/1924 | Atwood ......................... | 367/141 |
| 2,572,255 A * | 10/1951 | Gallaway ........................ | 367/16 |
| 3,331,050 A | 7/1967 | Kilmer et al. | |
| 3,611,975 A | 10/1971 | Ashbrook | |
| 3,618,555 A | 11/1971 | Kelly et al. | |
| 3,648,642 A | 3/1972 | Fetrow et al. | |
| 3,673,556 A | 6/1972 | Biggs | |
| 3,774,570 A | 11/1973 | Pearson | |
| 3,932,835 A | 1/1976 | Abbott | |
| 3,943,483 A | 3/1976 | Strange | |
| 3,961,303 A | 6/1976 | Paitson | |
| 4,027,616 A * | 6/1977 | Guenther et al. ............. | 114/244 |
| 4,033,278 A | 7/1977 | Waters | |
| 4,038,630 A | 7/1977 | Chelminski | |
| 4,055,138 A | 10/1977 | Klein | |

(Continued)

FOREIGN PATENT DOCUMENTS

| | | |
|---|---|---|
| EP | 0 884 607 | 6/1998 |
| GB | 1165834 | 10/1969 |

(Continued)

OTHER PUBLICATIONS

How Submarines Work. By Marshall Brain and Craig Freudenrich, Ph.D. http://science.howstuffworks.com/transport/engines-equipment/submarine5.htm/printable. Downloaded: Oct. 15, 2012.*

(Continued)

*Primary Examiner* — Mark Hellner
*Assistant Examiner* — Ari M Diacou

(57) ABSTRACT

A steerable seismic energy source includes at least one float. The floatation device includes a device for changing buoyancy thereof. A frame is coupled to the at least one float. At least one seismic energy source is suspended from the frame. At least one steering device is coupled to the floatation device or the frame. The at least one steering device includes at least one control surface and a control surface actuator coupled to the control surface. The actuator is configured to rotate the control surface to generate hydrodynamic lift at least in a vertical direction.

15 Claims, 4 Drawing Sheets

(56) References Cited

U.S. PATENT DOCUMENTS

| | | |
|---|---|---|
| 4,064,479 A | 12/1977 | Ruehle |
| 4,222,340 A | 9/1980 | Cole |
| 4,290,124 A | 9/1981 | Cole |
| 4,350,111 A | 9/1982 | Boyce, II |
| 4,382,486 A | 5/1983 | Ruehle |
| 4,404,664 A | 9/1983 | Zachariadis |
| 4,625,302 A | 11/1986 | Clark |
| 4,709,355 A | 11/1987 | Woods et al. |
| 4,719,987 A | 1/1988 | George, Jr. et al. |
| 4,729,333 A | 3/1988 | Kirby et al. |
| 4,890,568 A | 1/1990 | Dolengowski |
| 4,928,262 A | 5/1990 | Neeley et al. |
| 4,974,213 A | 11/1990 | Siwecki |
| 5,113,376 A | 5/1992 | Bjerkoy |
| 5,357,892 A | 10/1994 | Vatne et al. |
| 5,404,339 A | 4/1995 | Cole, Jr. |
| 5,532,975 A | 7/1996 | Elholm |
| 6,002,648 A | 12/1999 | Ambs |
| 6,019,652 A | 2/2000 | Nielsen et al. |
| 6,111,817 A | 8/2000 | Teeter |
| 6,230,840 B1 | 5/2001 | Ambs |
| 6,459,653 B1 | 10/2002 | Kuche |
| 6,755,144 B1 | 6/2004 | Hocquet et al. |
| 7,047,898 B2 | 5/2006 | Petersen et al. |
| 7,167,412 B2 | 1/2007 | Tenghamn |
| 7,457,193 B2 * | 11/2008 | Pramik .......................... 367/16 |
| 2006/0133199 A1 | 6/2006 | Tenghamn |
| 2006/0133200 A1 | 6/2006 | Tenghamn |
| 2006/0285434 A1 | 12/2006 | Welker et al. |
| 2008/0019214 A1 | 1/2008 | Pramik |
| 2009/0141587 A1 * | 6/2009 | Welker et al. .................... 367/16 |

FOREIGN PATENT DOCUMENTS

| | | |
|---|---|---|
| GB | 1 569 184 | 6/1980 |
| RU | 2317572 | 2/2008 |
| SU | 1702333 | 12/1991 |
| WO | WO 98/28636 | 7/1998 |
| WO | 2008008127 | 1/2008 |

OTHER PUBLICATIONS

Wikipedia contributors. Submarine. Wikipedia, The Free Encyclopedia. Dec. 21, 2008, 20:22 UTC. Available at: http://en.wikipedia.org/w/index.php?title=Submarine&oldid=259397590. Accessed Dec. 6, 2012.*

Verd, G., Hunsaker, G., "Dolphin—Flexibility for Submarine Research and Ddevelopment", (1977) Oceans, vol. 9, pp. 53-57.

Michael J. Grimble, Gerrit M. van der Molen, Eduardo Liceaga-Castro, "Submarine Depth and Pitch Control", Second IEEE Conference, Sep. 13-16, 1993, pp. 953-958.

N. Marquart, European Search Report, Date of Mailing Apr. 27, 2011.

Eurasian Patent Search Report in Application No. 201001795 dated Mar. 29, 2011, 1 page.

* cited by examiner

DEPTH STEERABLE SEISMIC SOURCE ARRAY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of seismic surveying. More specifically, the invention relates to devices for navigating a marine seismic source array suspended in water from a floatation device to avoid navigation hazards.

2. Background Art

In marine seismic surveying, a seismic energy source is used to generate seismic energy in the form of acoustic pulses or waves in a body of water such a lake or the ocean. The seismic energy travels downwardly in the water, through the water bottom, and through the Earth formations underlying the water bottom. Part of the energy passing through the Earth formations underlying the water bottom is reflected upward from acoustic impedance boundaries in the Earth formations. The upwardly traveling seismic energy is detected by sensors such as hydrophones towed in one or more streamer cables disposed near the water surface, or by sensors disposed in cables along the water bottom. The sensors convert the detected energy to electrical or optical signals. The electrical or optical signals are then conditioned and interpreted to provide information both as to the composition and the structure of the various subsurface Earth formations. Such information is used particularly to determine the possibility that such Earth formations may contain mineral deposits such as hydrocarbons.

The most frequently used marine seismic energy source known in the art is an "air gun array." A typical air gun array is a plurality of individual air guns of different sizes towed behind a seismic survey vessel or a source vessel. The air guns are ultimately suspended from a buoy, float or similar flotation device. The flotation device is typically coupled to a frame or similar substantially rigid structure so as to suspend the frame in the water. Individual air guns forming the array may be suspended from the frame by cables or chains of selected length so that the individual air guns are operated at a selected depth in the water. In air gun arrays known in the art, the floatation device may be steerable in the plane of the surface of the water, but remains proximate the surface of the water by reason of the buoyancy of the floatation device.

SUMMARY OF THE INVENTION

A steerable seismic energy source according to one aspect of the invention includes at least one floatation device. The floatation device includes a device for changing buoyancy thereof. A frame is coupled to the at least one floatation device. At least one seismic energy source is suspended from the frame. At least one steering device is coupled to the floatation device. The at least one steering device includes at least one control surface and a control surface actuator operatively coupled to the control surface. The actuator is configured to rotate the control surface to generate hydrodynamic lift at least in a vertical direction.

A method for operating a seismic energy source in a body of water according to another aspect of the invention includes suspending at least one seismic energy source from a floatation device. The floatation device is towed in the water by a tow vessel. Buoyancy of the floatation device is reduced to cause submergence thereof in the event of a navigation hazard proximate the water surface.

Other aspects and advantages of the invention will be apparent from the following description and the appended claims.

DETAILED DESCRIPTION

Figure 1:
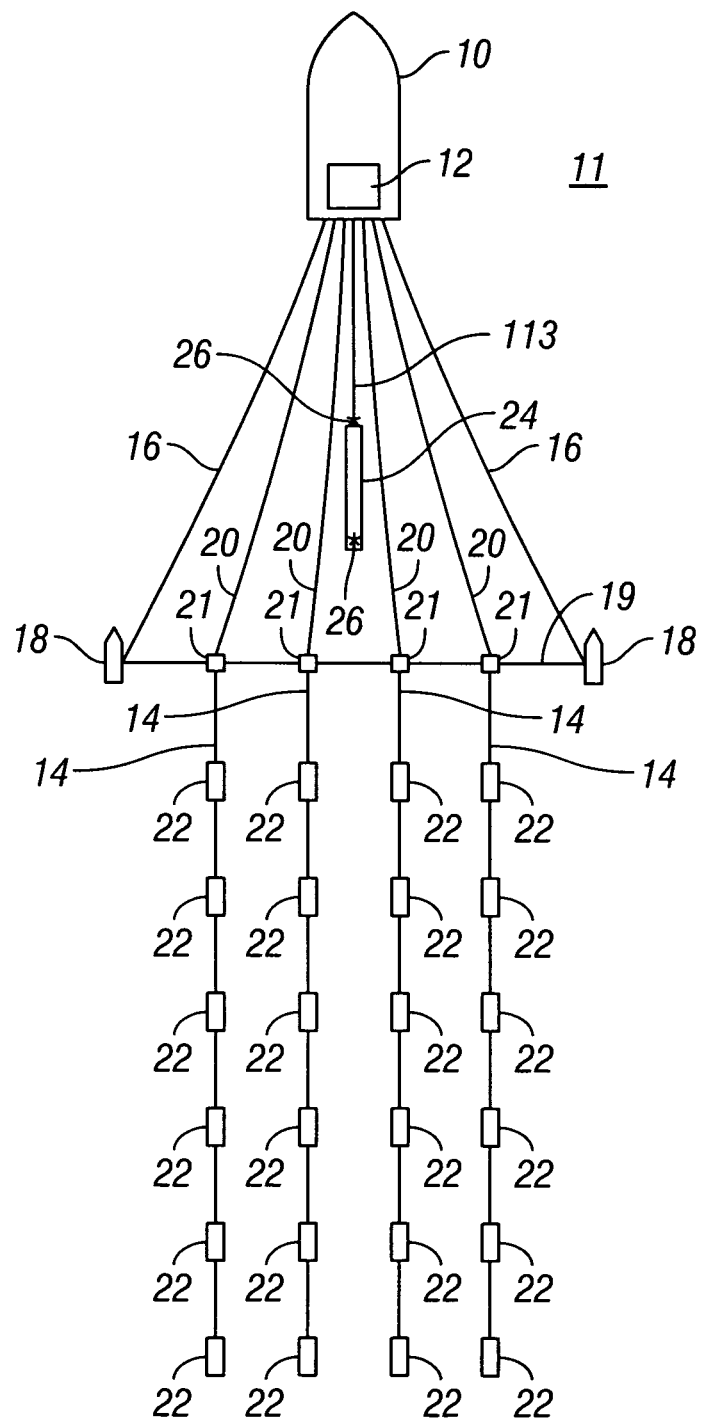
FIG. 1 shows an example seismic acquisition system.

An example marine seismic data acquisition system that may be used with a seismic source according to the invention is shown schematically in FIG. 1. The acquisition system includes a seismic vessel 10 that moves along the surface of a body of water 11 such as a lake or the ocean. The seismic vessel 10 includes thereon equipment, shown generally at 12 and described for convenience herein as a "recording system" that may include (none shown separately in FIG. 1) data recorders, navigation devices such as global positioning system ("GPS") receivers and seismic energy source control devices. The recording system 12 may also include equipment for operating buoyancy control and hydrodynamic lift devices on one or more seismic source arrays as will be explained below in more detail.

The seismic acquisition system may include a plurality of seismic sensor streamers 14 towed by the seismic vessel 10 as shown in FIG. 1 or by a different vessel (not shown). The streamers 14 are generally cables that extend behind the towing vessel for a certain distance, and each such streamer 14 includes seismic sensors 22 disposed thereon at spaced apart locations. The seismic sensors 22 are typically pressure or pressure time gradient responsive sensors such as hydrophones but may also be particle motion responsive sensors such as accelerometers or geophones, or combinations of hydrophones and geophones. The type of sensor is not a limitation on the scope of the present invention. Geometry of the streamers in the water is maintained by various towing devices including lateral force generating devices called "paravanes" 18 disposed at the end of paravane lead in ropes 16. The streamers 14 are coupled at their forward ends to a respective termination 21, which couples the streamer 14 to a corresponding lead in cable 20. The paravane lead in ropes 16 and lead in cables 20 may be deployed from the vessel 10 and retrieved thereon by winches (not shown) or similar spooling devices known in the art. The lateral separation of the paravanes 18 may be limited by a spreader cable 19 ultimately to maintain the geometry of the entire array of streamers 14. In some examples the centermost section of the spreader cable 19 may be omitted.

The seismic vessel 10 may also tow, or another vessel (not shown) may tow one or more seismic source arrays 24. Only one such array is shown in FIG. 1 for clarity of the illustration. The seismic source array 24 typically includes a plurality of seismic energy sources, which in the present example may be air guns having various chamber sizes, as explained above. Upon suitably timed actuations of all the individual air guns in the array 24 (typically by control signals from the recording unit 12) a seismic energy pulse of particular spectral content is imparted into the water 11. Seismic signals resulting from such actuations are detected by the seismic sensors 22, and the detected signals are communicated to the recording system 12. The manner of recording and processing signals detected by the various seismic sensors 22 is well known in the art and will not be further described herein.

The seismic source array 24 may be towed by the vessel 10 using an umbilical cable 113. The source array 24 may include a steering device 26 proximate one or each longitudinal end thereof. The umbilical cable 113 may include (none shown separately) a strength member to transfer towing force of the vessel 10 to the source array 24, one or more compressed air or gas lines, and electrical and/or optical conductors for communication between various components of the source array 24 and the recording system 12. As will be explained below, the steering device 26 may provide steering capability to the source array 24 in both lateral direction and in depth. In one example, the steering device 26 may use a single wing or foil to perform steering in both vertical and horizontal directions. The source array 24 may also include one or more floatation devices (see FIGS. 2 and 3) that can provide controllable buoyancy to the source array 24.

Figure 2:
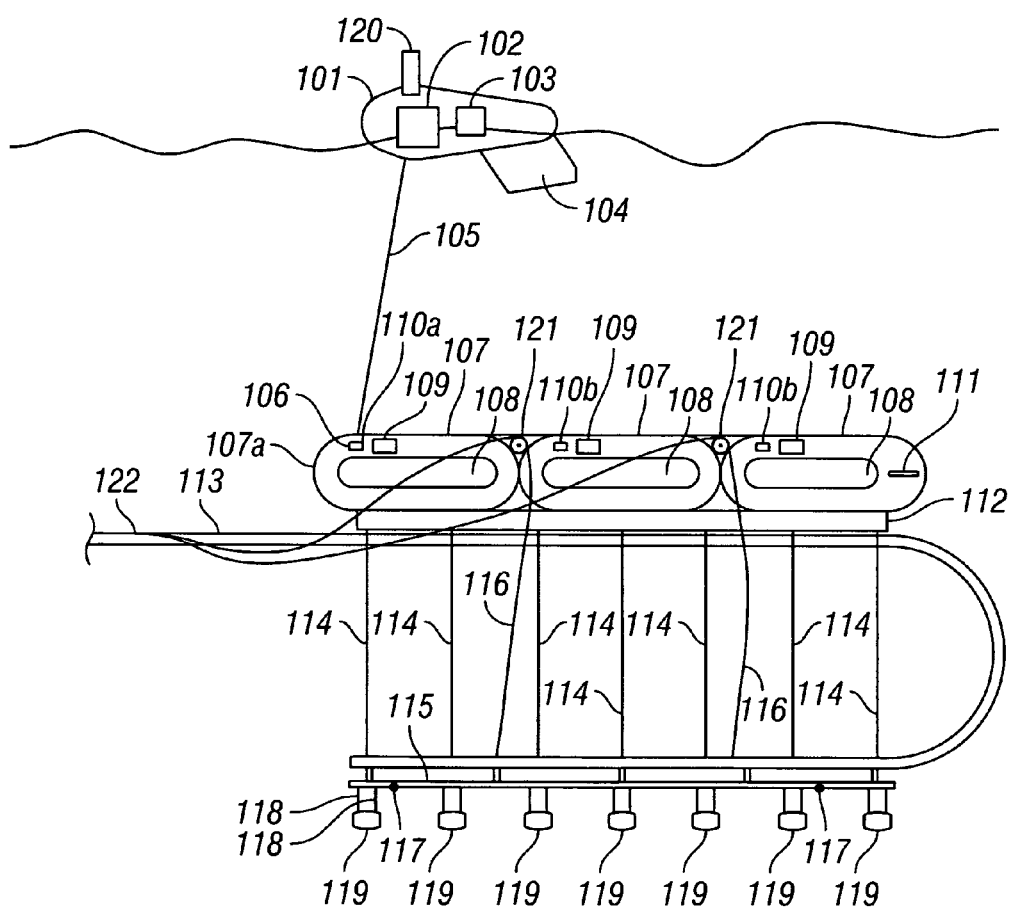
FIG. 2 shows the seismic source array of FIG. 1 in more detail.

An example of the source array 24 is shown schematically in FIG. 2. The source array 24 may be towed by the survey vessel (10 in FIG. 1) from the aft end of the umbilical cable 113, as previously explained. The source array 24 in the present example includes a main keel or beam 112, which is typically coupled to the umbilical cable 113. The beam 112 suspends a sub frame 115 at a selected distance therefrom using depth control ropes 114. One or more seismic energy sources 119 (e.g., air guns) may be suspended from the sub-frame 115 by chains 118 or similar suspension devices. Source depth determination may be performed by mounting depth (e.g., pressure) sensors 117 at a known vertical distance from the seismic energy sources 119. The number of seismic energy sources in any particular implementation is not a limit on the scope of the present invention, nor is the invention limited to air guns. The invention may also be used with marine vibrators and water guns, as non liming examples.

The main beam 112 can be connected to one or more floatation devices 107, each of which consists of a volume of buoyant void filler, for example, foamed styrene or foamed polyurethane enclosed in a sealed housing (shown collectively at 107a). The interior of each housing may define one or more liquid tight chambers 108 for ballasting with water. Thus, each floatation device 107 has a controllable buoyancy. The present example shows three such floatation devices 107. Other examples, one of which will be explained below with reference to FIG. 6, may include only a single such flotation device. The number of such floatation devices is a matter of discretion for the designer of a source array according to the various aspects of the invention and is not intended to limit the scope of the invention. A possible advantage to using more than one floatation device as shown in the present example is to provide better control over leveling of the source array 24.

Ballasting can be controlled by a buoyancy regulating device 109. The buoyancy regulating device 109 (explained below with reference to FIG. 3) can operate automatically, depending on measurements made from a depth (e.g., pressure) sensor 110a, a load cell 106, and level or tilt sensors 110b. A control surface 111 can be used to correct temporary depth and/or level fluctuations. An example mechanism to operate the control surface 111 will be explained with reference to FIG. 4. The dimensions of the housing, void fill, housing material, and internal chambers 108 may be selected such that the floatation devices 107 provide enough buoyant force to lift the floatation devices 107 to the water surface when all water is expelled from the chamber(s) 108, and may provide neutral or slight negative buoyancy when the chamber(s) 108 are fully ballasted with water.

In some examples, a surface reference buoy 101 with a tail fin 104 for stabilizing movement in the water may be suspended from the front of the forwardmost one of the floatation units 107 by a line, cable or rope 105. The rope 105 may be connected at one end to the load cell 106. Measurements made by the load cell 106 provide indication of how much weight load is exerted by the front of the source array 24 on the reference buoy 101. Such weight indication can be used to adjust the floatation ballast to correct the floatation of the source array 24 to make it level. Measurements from the load cell 106 can also indicate if the reference buoy 101 has broken loose.

The other end of the rope 105 may be connected to a winch unit 102 disposed in the reference buoy 101 for depth control of the source array. The winch unit 102 may be controlled by a control and communication unit 103. The communication unit 103 may be in signal communication with the recording system (12 in FIG. 1) using, for example a radio link. A GPS receiver 120 may be disposed on the reference buoy 101 for geodetic position determination. Other examples may omit the surface reference buoy 101. If, for example, it is desired to increase the depth of the source array, a signal may be transmitted from the recording system (12 in FIG. 1) to the communication unit 103. The communication unit 103 will operate the winch 102 to extend the rope 105.

Two or more handling cables 116 may be routed through the beam 112 and corresponding guide blocks 121. The handling cables 116 extend from floatation units 107 to anchor point 122 on the umbilical cable 113. The anchor point 122 may be located a selected distance forward of the floatation units 107. The handling cables 116 may be used for deployment and recovery of the source array 24.

Figure 3:
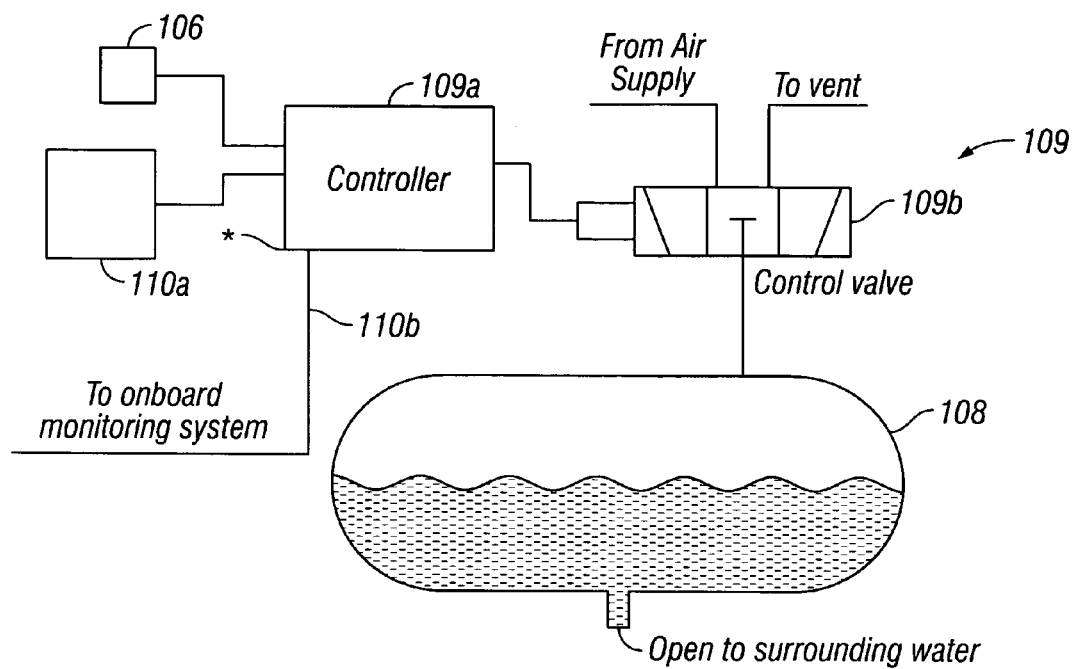
FIG. 3 shows an example ballast control device.

An example of one of the buoyancy control devices 109 is shown schematically in FIG. 3. A controller 109a, such as a microprocessor may accept as input measurements from one of the tilt sensors 110b and the depth (pressure) sensors 110a. The controller 109a may also be in signal communication with the recording system (12 in FIG. 1).

The forwardmost one of the buoyancy control devices 109, may in some examples accept as input signals from the load cell 106. In the present example, some of the weight in water of the source array (24 in FIG. 2) may be supported by the reference buoy (101 in FIG. 2). The buoyant force exerted by the reference buoy (101 in FIG. 2) will be measured by the load cell 106. If the measured force is outside of a predetermined range, the ballasting can be adjusted by the buoyancy control device 109. If the desired depth is not reached with the desired reference buoy load, the winch (102 in FIG. 2) must change the length of the deployed rope (105 in FIG. 2). Such change may be performed, for example, by communicating the load cell 106 measurement to the recording system (12 in FIG. 1) over the umbilical cable (113 in FIG. 1), which will transmit a signal to the reference buoy (101 in FIG. 2) to cause the winch (102 in FIG. 2) to extend the rope (105 in FIG. 2).

Output of the controller 109a may be coupled to a solenoid operated three-way pneumatic control valve 109b. When signals from one or more of the sensors (e.g., depth sensor 110a, tilt sensor 110b, and load cell 106) indicate that the buoyancy should be increased, the controller 109a operates the valve 109b to connect a source of compressed air or gas (not shown) to the chamber 108. Pressurized gas from the compressed gas source (not shown) may displace water in the chamber 108, thereby increasing the buoyancy of the particular flotation device (107 in FIG. 2). When the correct buoyancy has been attained, the controller 109a may operate the valve 109b to close the chamber 108, thereby maintaining the water level in the chamber 108. In case buoyancy is required to be decreased, the controller 109a may operate the valve 109b to vent the chamber 108, so that water can enter the bottom of the chamber 108. The controller 109a may be programmed to operate the valve 109b to maintain the floatation device (107 in FIG. 2) at selected depth in the water. The selected depth may be changed, for example, by communicating a control signal from the recording system (12 in FIG. 1) to the controller 109a, for example, through a signal line (not shown separately) in the umbilical cable (113 in FIG. 2). Such signal may be converted in the controller 109a into a signal to selectively operate the pneumatic valve 109b.

In one example, the valve 109b is configured so that in the event of electrical or other component failure in the source array (24 in FIG. 1), the default or failure mode position of the valve 109b is to connect the chamber 108 to the source of compressed gas or air. By such configuration, the chamber(s) 108 will be automatically purged of water and the source array (24 in FIG. 1) will be returned to the water surface for retrieval in the event off component failure.

Figure 4:
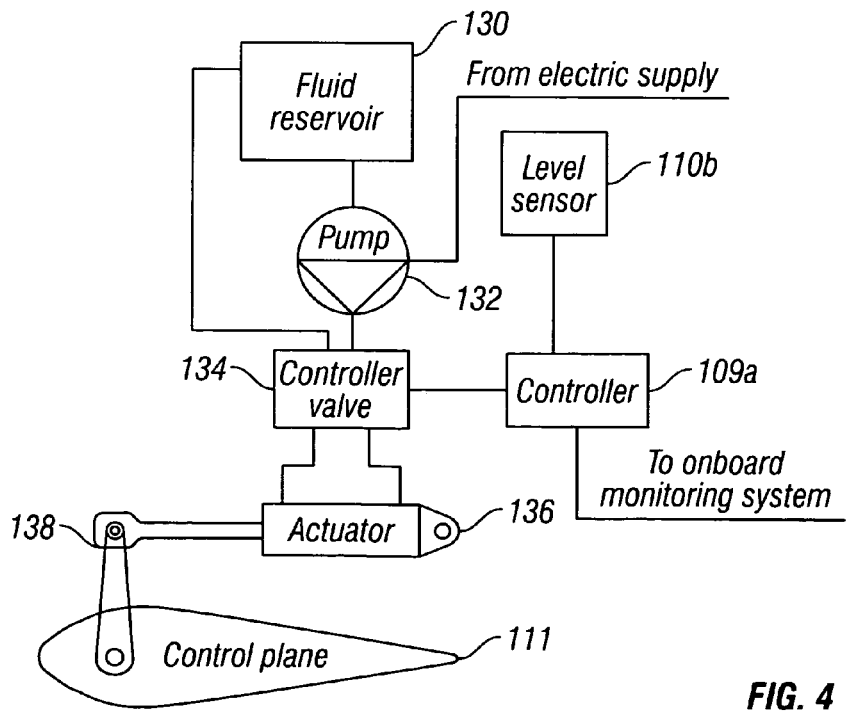
FIG. 4 shows one example of an actuator for operating a control surface on the source array of FIG. 2.

An example mechanism to operate the control surface 111 is shown schematically in FIG. 4. The present example uses an hydraulic actuator 136 coupled by a suitable linkage 138 to the control surface 111. The actuator may be operated by a solenoid operated valve 134 in signal communication with the controller 109a. Hydraulic power to move the actuator may be provided by a pump 132 connected to an hydraulic reservoir 130. The controller 109a may be programmed to operate the valve 134, thereby operating the control surface 111 so that the associated flotation device (107 in FIG. 2) is maintained at the selected depth, or is leveled in the event the source array (24 in FIG. 1) becomes unleveled (greater depth at one end than at the other). The control valve 134 may contain a hydraulic brake valve (not shown separately) to lock the motion of hydraulic actuator 136, making the control surface 111 resistant to being moved by force of moving the source array through the water. Such a brake valve could be implemented using, for example, using a three way valve such as shown above for the solenoid operated valve 134. In a typical three way valve, the center position closes all valve ports, thereby stopping motion of hydraulic fluid into and out of the actuator 136.

Figure 5:
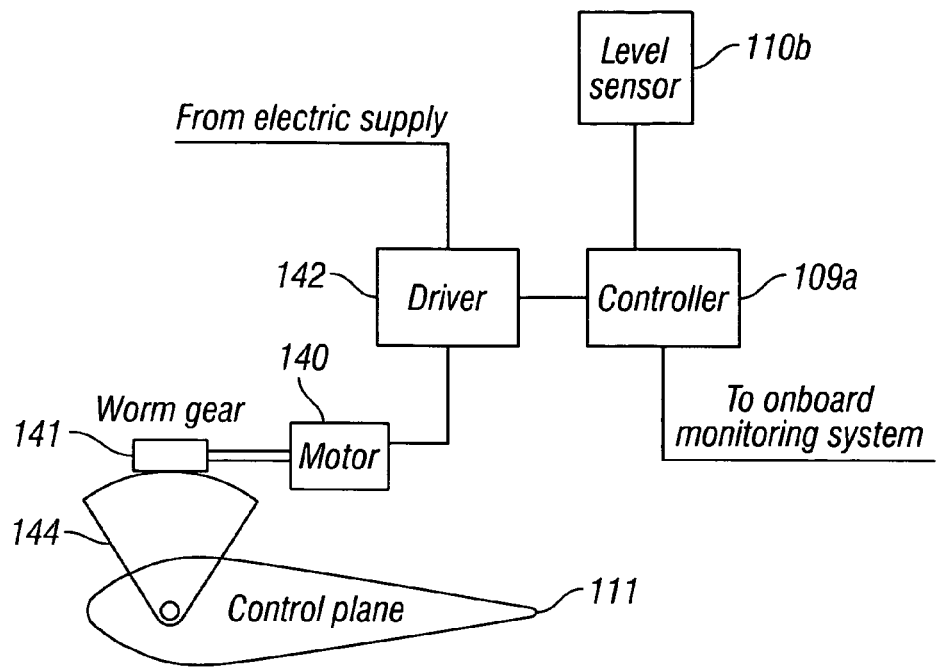
FIG. 5 shows an alternative actuator for the control surface.

Another example mechanism to operate the control surface 111 is shown schematically in FIG. 5. The controller 109a may be in signal communication with a motor driver 142, which operate an electric motor 140. The motor 140 may turn a worm gear 141. The worm gear may be in contact with a toothed sector 144. The sector 144 may rotate the control surface 111 in response to being moved by the worm gear 141. A possible advantage of the mechanism shown in FIG. 5 is that when the motor 140 and worm gear 141 are not rotating, they act to lock the position of the sector 144, thus making the control surface resistant to being moved by force of moving the source array through the water.

The foregoing example of a source array may be operated at any selected depth in the water by changing the buoyancy of the flotation devices (107 in FIG. 2) as explained above and by operating the control surface (111 in FIG. 2). The length of the rope or line (105 in FIG. 2) may be adjusted by the winch unit (102 in FIG. 2) to maintain a selected tension on the line (105 in FIG. 2) as measured by the load cell (106 in FIG. 2), irrespective of the operating depth of the source array (24 in FIG. 1).

Other examples of the source array (24 in FIG. 1) may omit the reference buoy (101 in FIG. 2). Such examples may be used in areas where it is likely to encounter ice or other navigation hazards on the surface of the water (11 in FIG. 1). In the event any such navigation hazard is encountered, the flotation devices (107 in FIG. 2) may be made negatively buoyant by ballasting with water as explained above, and one or more steering devices 26 may be operated to submerge and cause the source array to move to greater depth in the water.

Figure 6:
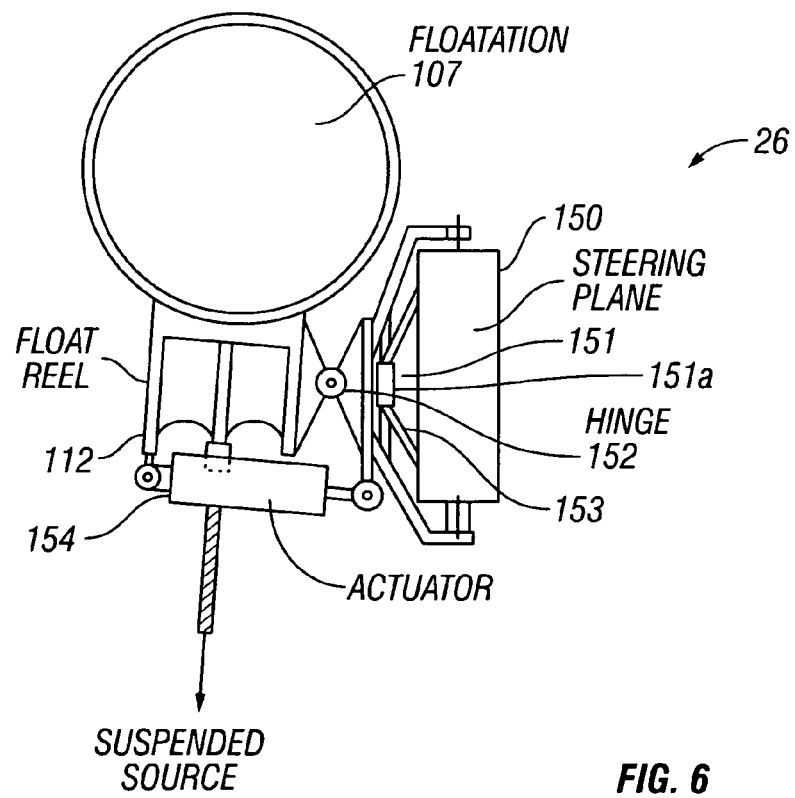
FIG. 6 shows another example seismic source that does not use a reference buoy.

An example source array that may omit use of the reference buoy, and uses one or more steering devices (26 in FIG. 1) is shown in FIG. 6. In the present example of steering device there may be only one flotation device 107 coupled to the beam 112, having a longitudinal dimension approximately the same as that of the upper part of the beam 112. The beam 112 may have a steering foil or plane 150, which may be coupled to a mechanism 151 (including an actuator 151a and corresponding linkage 153) to cause rotation of the plane 150 along an axis perpendicular to the direction of motion of the floatation device 107 (i.e., its longitudinal dimension) and the beam 112 in the water. Such rotation of the plane 150 may cause lateral hydrodynamic lift as the source array (24 in FIG. 1) is moved through the water. Lateral hydrodynamic lift may be used to position the source array in a selected position with reference to the towing vessel (e.g., vessel 10 in FIG. 1). The steering device 26 may also include a mechanism including an actuator 154 and a hinge 152 coupled to the base of the deflecting mechanism 151 to enable the plane 150 to rotate about an axis parallel to the direction of motion of the flotation device 107 and the beam 112. Such deflection provides hydrodynamic lift in a vertical direction. The actuators 151a and 154 in the present example may be linear actuators, for example, hydraulic cylinder/ram combinations or electric linear actuators. Examples of the latter type of actuator may be obtained from LINAK A/S Smedevænget 8, 6430 Nordborg, Denmark.

When it may be necessary to submerge the source array to avoid hazards on the water surface (such as ice), the flotation device 107 may be ballasted with water, and the plane 150 may be operated, such as by operating the actuator 154 to generate downward hydrodynamic force. The source array may be returned to the surface after the hazard has passed by removing the water ballast from the chamber (108 in FIG. 3) in the floatation device 107, and the plane 150 may be operated by moving the actuator 154 so that the plane 150 generates no upward or downward lift, or generates upward lift until the source array flotation device 107 is at the water surface. The foregoing submersion of the source array may also be performed to cause the seismic sources (119 in FIG. 2) to be operated at a selected water depth different from that obtained when the flotation device 107 is disposed proximate the water surface by buoyancy.

Various examples of a marine seismic source according to the various aspects of the invention may be able to operate at a selected depth for certain seismic surveying purposes, and may be navigable to avoid hazards on the water surface. In some cases it may be desirable to submerge the entire source array, including the float, to operate the seismic energy sources at greater depth in the water. In some cases it may also be desirable to be able to submerge the floatation device to avoid navigation hazards such as ice. Using source array structures known in the art prior to the present invention, it was generally not possible to change the floatation device depth during operation of the seismic source array. A seismic source array according to the invention may be fully submerged to operate the seismic sources at greater water depth and to avoid surface navigation hazards such as ice.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for operating a seismic energy source in a body of water, comprising:
    suspending at least one seismic energy source from a floatation device, the floatation device towed in the water by a tow vessel;
    reducing buoyancy of the floatation device to cause submergence thereof in the event of a navigation hazard proximate the water surface.

2. The method of claim 1 further comprising increasing buoyancy of the floatation device after avoidance of the navigation hazard to return the floatation device to the water surface.

3. The method of claim 2 wherein the increasing buoyancy comprises expelling water from an internal chamber in the floatation device.

4. The method of claim 1 wherein the reducing buoyancy comprises filling an internal chamber in the floatation device with water.

5. The method of claim 1 wherein the reducing buoyancy is performed at separate positions along a length of the floatation device such that the floatation device remains substantially level beneath the water surface.

6. The method of claim 1 further comprising operating a control surface to change the water depth of the floatation device.

7. The method of claim 1 wherein the at least one seismic energy source comprises an air gun.

8. A method for manufacturing a geophysical data product, comprising:
    suspending at least one seismic energy source in a body of water from a floatation device, the floatation device towed in the water by a tow vessel;
    reducing buoyancy of the floatation device to cause submergence thereof in the event of a navigation hazard proximate the water surface;
    activating the at least one seismic energy source;
    detecting seismic energy in the body of water resulting from actuating the at least one seismic energy source; and
    recording data corresponding to the detected seismic energy on a non-transitory computer-readable medium.

9. The method of claim 8 further comprising increasing buoyancy of the floatation device after avoidance of the navigation hazard to return the floatation device to the water surface.

10. The method of claim 9 wherein the increasing buoyancy comprises expelling water from an internal chamber in the floatation device.

11. The method of claim 8 wherein the reducing buoyancy comprises filling an internal chamber in the floatation device with water.

12. The method of claim 8 wherein the reducing buoyancy is performed at separate positions along a length of the floatation device such that the floatation device remains substantially level beneath the water surface.

13. The method of claim 8 further comprising operating a control surface to change the water depth of the floatation device.

14. The method of claim 8 wherein the at least one seismic energy source comprises an air gun.

15. A method for operating a seismic energy source in a body of water, comprising:
    towing, by a tow vessel, a floatation device coupled to at least one seismic energy source; and
    in response to a navigation hazard proximate the water surface, reducing buoyancy of the floatation device to cause the floatation device to submerge.

* * * * *